United States Patent
Choudhury et al.

(10) Patent No.: US 8,254,737 B2
(45) Date of Patent: Aug. 28, 2012

(54) SYSTEM AND TAPERED WAVEGUIDE FOR IMPROVING LIGHT COUPLING EFFICIENCY BETWEEN OPTICAL FIBERS AND INTEGRATED PLANAR WAVEGUIDES AND METHOD OF MANUFACTURING SAME

(75) Inventors: Masum Choudhury, Naperville, IL (US); Moshe Oron, Rehovot (IL); Thomas R. Stanczyk, Lisle, IL (US); Ram Oron, Nes-Ziona (IL); Ariela Donval, Rosh Haayin (IL); Dean Richardson, Wilmette, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/583,523

(22) PCT Filed: Aug. 22, 2005

(86) PCT No.: PCT/US2005/029815
§ 371 (c)(1),
(2), (4) Date: Jul. 24, 2007

(87) PCT Pub. No.: WO2006/023862
PCT Pub. Date: Mar. 2, 2006

(65) Prior Publication Data
US 2007/0274654 A1    Nov. 29, 2007

(51) Int. Cl.
*G02B 6/26* (2006.01)
*G02B 6/42* (2006.01)
*G02B 6/10* (2006.01)
(52) U.S. Cl. ............................. 385/43; 385/28; 385/146
(58) Field of Classification Search .................... 385/43, 385/146, 28
See application file for complete search history.

(56) References Cited

U.S. PATENT DOCUMENTS

| | | | |
|---|---|---|---|
| 4,944,838 A * | 7/1990 | Koch et al. | 438/751 |
| 5,930,423 A | 7/1999 | Chen et al. | |
| 6,580,863 B2 * | 6/2003 | Yegnanarayanan et al. | 385/132 |
| 6,760,520 B1 | 7/2004 | Medin et al. | |
| 6,937,797 B2 * | 8/2005 | Mizuno et al. | 385/43 |
| 7,197,224 B2 | 3/2007 | Rolson et al. | |
| 7,251,406 B2 * | 7/2007 | Luo et al. | 385/131 |
| 2003/0081924 A1 | 5/2003 | Yegnanarayanan et al. | |

(Continued)

FOREIGN PATENT DOCUMENTS

EP    0 411 816 A2    2/1991

(Continued)

OTHER PUBLICATIONS

International Search Report for PCT/US05/029815.

(Continued)

*Primary Examiner* — Uyen Chau N Le
*Assistant Examiner* — John M Bedtelyon
(74) *Attorney, Agent, or Firm* — Timothy M. Morella

(57) ABSTRACT

A tapered waveguide optical mode transformer (20) includes a tapered core formed on a planar substrate structure (16). To vertically taper the core (21), steps (22) are etched into the top surface of the core. The steps have depths and lengths along the optical axis of tapered waveguide that are selected to transform the optical mode characteristics of a desired optical fiber to the optical mode characteristics of a desired planar waveguide. The core can also be tapered horizontally to form a 2-D tapered waveguide. The tapered waveguide can be integrally included in planar lightwave circuits (PLCs) to reduce light coupling losses between optical fibers and the PLC waveguides.

16 Claims, 3 Drawing Sheets

U.S. PATENT DOCUMENTS

| | | | |
|---|---|---|---|
| 2004/0047161 A1* | 3/2004 | Mochizuki et al. | 362/511 |
| 2005/0152648 A1* | 7/2005 | Madsen et al. | 385/49 |

FOREIGN PATENT DOCUMENTS

| | | |
|---|---|---|
| JP | 03-221853 | 3/1993 |
| JP | 03-299624 | 5/1993 |
| JP | 05-094252 | 11/1994 |
| JP | 06-314786 | 7/1996 |
| JP | 2001-091772 | 4/2001 |
| JP | 2000-301490 | 4/2002 |
| JP | 2002-156539 | 5/2002 |
| JP | 2001-272597 | 3/2003 |
| JP | 2002-005415 | 7/2003 |

OTHER PUBLICATIONS

English Translation of JP 2001-091772.

L Pavesi, "Will Silicon be the Photonic Material of the Third Millenium?", Journal of Physics: Condensed Matter, Apr. 24, 2003, pp. R1169-R1196, vol. 15, IOP Publishing Ltd., United Kingdom.

* cited by examiner

SYSTEM AND TAPERED WAVEGUIDE FOR IMPROVING LIGHT COUPLING EFFICIENCY BETWEEN OPTICAL FIBERS AND INTEGRATED PLANAR WAVEGUIDES AND METHOD OF MANUFACTURING SAME

TECHNICAL FIELD

The present invention relates generally to planar lightwave circuits and, more particularly, to optical mode transformers for efficiently coupling optical fibers to planar integrated waveguides.

BACKGROUND

Planar Lightwave Circuits (PLCs) transmit and receive signals for both short distance data and long distance telecommunication systems. For optimal operation, the PLCs have functional optical components, such as waveguides. These waveguides should be small enough in size so that dense integration of waveguide optical devices, including sharp bends in the waveguides, is possible on a single chip.

High-index-contrast material systems work well for fabricating PLCs. Such material systems can be formed as a core layer of silicon, on a Silicon On Insulator (SOI) substrate, The core layer has a refractive index of about 3.5, and it is surrounded on both side by silica cladding with a refractive index of about 1.5. A waveguide formed in such a structure is called a channel waveguide. Channel waveguides offer better light confinement in smaller dimensions.

There are potentially many practical uses of high-index-contrast waveguide chips, especially in telecommunications, where there is a need for developing ways to route and process multi-wavelength optical signals transparently (i.e., without having to convert optical signals to electrical signals for processing, and then back again). One example of a PLC waveguide chip is a single-mode waveguide-based "mux" and "demux" for serializing and separating multi-wavelength optical signals in Dense Wavelength Division Multiplexing (DWDM) applications. For this kind of application and others, it is generally desirable to configure the waveguides so as to force single-mode propagation to avoid introduction of undesirable effects of differing propagation velocities of different optical modes.

One of the most difficult challenges facing high-index-contrast optical chips is efficiently coupling light into and out of the chip. Particularly difficult is the coupling of light from a standard optical fiber or external source to a silicon waveguide on the chip. A large mismatch between the common optical fiber dimensions and that of the high-index-contrast waveguide, and their respective mode sizes, impairs light coupling from optical fibers to PLC waveguides.

A number of techniques have been utilized for optical coupling between waveguides and optical fibers, including prism couplers, grating couplers, tapered fibers and microlens mode transformers. Unfortunately, these techniques do not offer the combination of high coupling efficiency, wavelength independence, reliability, manufacturability, ruggedness, and robustness demanded for use in low-cost, high-volume telecommunications applications.

In view of the foregoing, there is a need for an improved coupling between optical fibers and planar waveguides formed on optical chips, such as PLCs.

SUMMARY

It is an advantage of the present invention to provide a tapered waveguide extension that significantly increases the light coupling efficiency between an optical fiber and a planar waveguide. The present invention also provides a relatively simple and reliable process for fabricating the tapered waveguide on a planar substrate structure so that it can be integrated with a PLC waveguide.

According to an embodiment of the invention, the tapered waveguide acts as an optical mode transformer between an optical fiber and a planar waveguide. The tapered waveguide includes a core formed on a planar substrate structure. The core is vertically tapered. To create the vertical taper, a plurality of steps is formed into the top surface of the core. The steps have depths and lengths along the optical axis of the tapered waveguide that are selected to transform the optical mode characteristics and size of the optical fiber to the optical mode characteristics and size of the planar waveguide.

Other aspects, features, embodiments, processes and advantages of the invention will be or will become apparent to one with skill in the art upon examination of the following figures and detailed description. It is intended that all such additional features, embodiments, processes and advantages be included within this description, be within the scope of the invention, and be protected by the accompanying claims.

BRIEF DESCRIPTION OF THE DRAWINGS

It is to be understood that the drawings are solely for purpose of illustration and do not define the limits of the invention. Furthermore, the components in the figures are not necessarily to scale, emphasis instead being placed upon illustrating the principles of the invention. In the figures, like reference numerals designate corresponding parts throughout the different views.

DETAILED DESCRIPTION

The following detailed description, which references to and incorporates the drawings, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Figure 1:
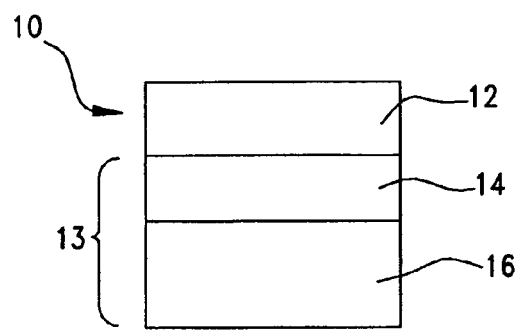
FIG. 1 is a cross-sectional schematic of an exemplary starting material structure for fabricating a tapered planar waveguide.

Turning now to the drawings, and in particular to FIG. 1, there is illustrated a cross-sectional schematic of an exemplary starting material structure 10 for fabricating a tapered planar waveguide. The preferred starting material 10 for fabricating 1-D and 2-D waveguides is a silicon-on-insulator (SOI) structure. The SOI starting material 10 includes a layer of crystalline silicon 12 grown on a planar substrate structure 13. The planar substrate structure includes a dielectric insulator layer 14 formed over a semiconductor substrate 16. The insulator layer 14 is a 2 μm thick layer of thermally grown SiO2 on a 6" silicon substrate 16. A 3 μm thick layer of crystalline silicon 12 is deposited on top of the SiO2 layer 14 to complete the structure.

The crystalline silicon layer 12, which makes up the core of the tapered waveguide 20 (See FIG. 2), has a refractive index of 3.47, the SiO2 layer 14 has a refractive index of 1.46, and the silicon substrate has a refractive index of 3.47.

Figure 2:
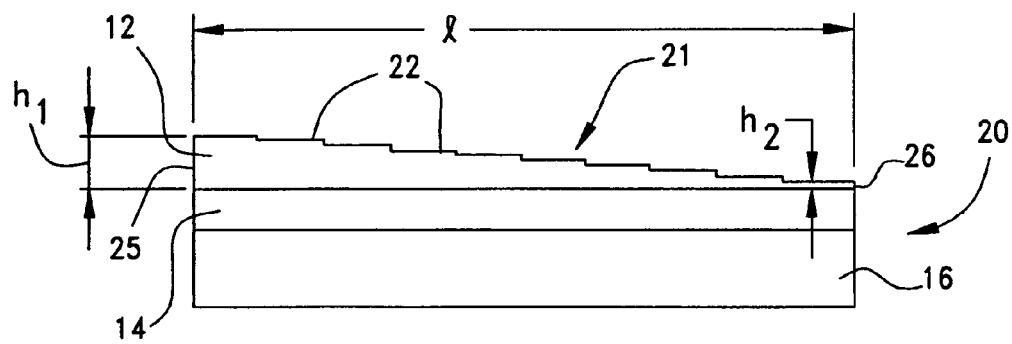
FIG. 2 is a conceptual cross-sectional side view of a tapered waveguide in accordance with an exemplary embodiment of the present invention.

FIG. 2 is a conceptual cross-sectional side view of a tapered waveguide 20 in accordance with an exemplary embodiment of the present invention. In FIG. 2, there is shown a 2-D tapered section 20 that acts as a classic adiabatic modal transformer that transforms the input fundamental mode shape (matched to the mode shape of an optical fiber) to that of a planar waveguide mode, making the light coupling more efficient than that with no taper at all.

The 2-D taper waveguide 20 includes a stepped crystalline silicon core 21 formed on a planar substrate structure 14,16. The core 21 is vertically and horizontally tapered (i.e., 2-D tapered). To create the vertical taper, a plurality of steps 22 are formed into the top surface of the core 21. The steps 22 have depths and lengths along the optical axis of the tapered waveguide 20 that are selected to transform the optical mode characteristics and physical dimensions of the optical fiber to the optical mode characteristics and physical dimensions of a planar waveguide formed on the same substrate with the tapered waveguide 20.

The tapered waveguide 20 includes a 1-D lateral flare that extends from the planar waveguide width w2 (See FIG. 3) at the tapered waveguide's narrow end 26 to a width w1 (See FIG. 3) of 4 μm at the tapered waveguide's wide end 25 to match the optical fiber, within a horizontal distance 1 of 250 μm. This lateral taper matches the mode field diameter (MFD) of a high numerical aperture (HNA) optical fiber to that of an integrated planar waveguide in the lateral direction.

Subsequent step etches are performed to create the stepped vertical taper along the core thickness in the 1-D flare area so that there is also a MFD match between the HNA fiber and the planar waveguide in the vertical direction. The vertical flare extends from the planar waveguide height h2 at the tapered waveguide's narrow end 26 to a height h1 of 3 μm at the tapered waveguide's wide end 25 to match the optical fiber, within the horizontal distance 1 of 250 μm.

Figure 4:
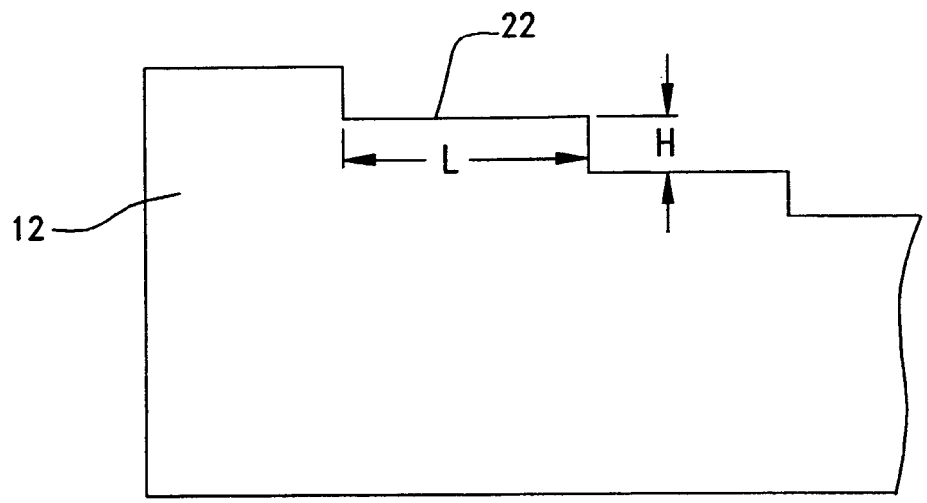
FIG. 4 is a conceptual cross-sectional side view showing dimensional details of the waveguide steps shown in FIG. 2.

FIG. 4 is a conceptual cross-sectional side view showing dimensional details of the tapered waveguide steps 22 shown in FIG. 2. Each step is formed to have a predefined length L and a predefined H. In the example tapered waveguide 20 disclosed herein, each step is 0.167 μm deep (H), and has a length L of 25 μm. The total etch depth over the length 1 of the tapered waveguide 20 is 1.5 μm.

Figure 5:
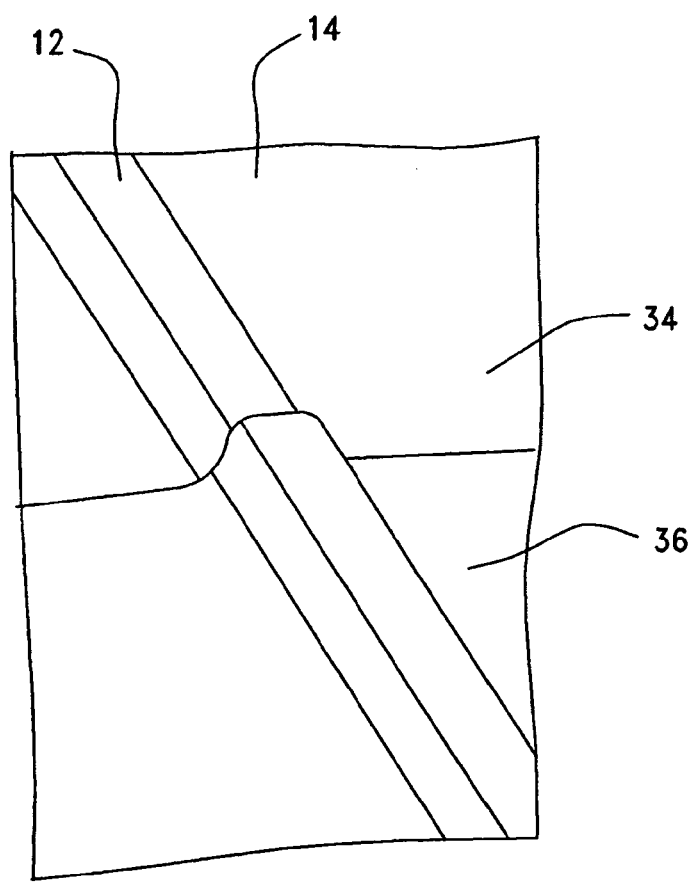
FIG. 5 is a conceptual perspective view of a waveguide step as it is being formed.

FIG. 5 is a conceptual perspective view of a tapered waveguide step 22 as it is being formed. The vertical steps 22 are formed using a novel process that relies on conventional photolithography and silicon etching techniques.

Before forming the vertical steps 22, the 1-D lateral taper is formed. This is an intermediate step toward the 2-D tapered waveguide 20. The 1-D lateral taper by itself has a coupling efficiency lower than that of the complete 2-D taper, but the 1-D taper requires less technological effort to form.

Figure 3:
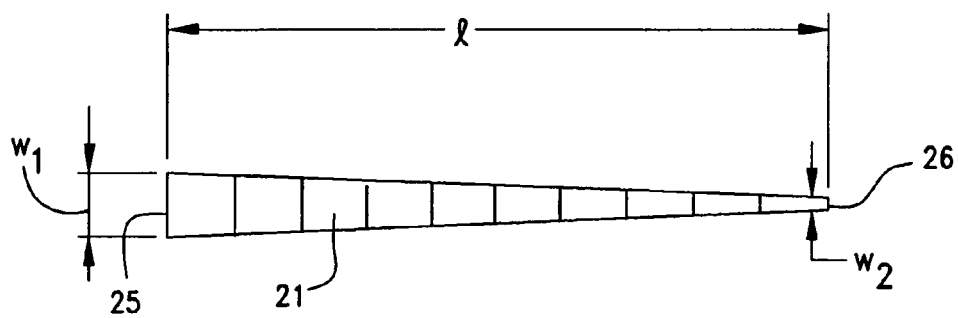
FIG. 3 is a conceptual top-down view of the tapered waveguide shown in FIG. 2.

As illustrated by FIG. 3, the mask that initially defines the tapered waveguide 20 on the starting material 10 defines the lateral taper with width dimensions starting from w2=0.5 μm up to w1=3 μm.

To define sub-micron width waveguide geometries, a photolithography technique using P4110 i-line (365 nm) photoresist from AZ, Inc. and a MA6 mask aligner from Karl Suss, Inc. is employed. After masking the starting material 10, the waveguides are etched using a silicon dry etching system from Oxford, Inc. C4F8 (flow rate 90 sccm)+SF6 (flow rate 50 sccm) slow etch chemistry is utilized in the Oxford machine for etching the waveguide geometries. The average depth of the waveguides is ~1 μm.

The vertical steps are formed by first applying a protective layer over a step area of the core layer 12 extending from the waveguide's wider end 25 location. As shown in FIG. 5, this is accomplished by covering the entire waveguide 12 with Shipley 1818 positive photoresist. Using an appropriate mask, the non-step portion 34 of the waveguide 12 is then exposed to UV light and the photoresist developed, leaving only 25 μm (the length of the first step) of protected area 36 covered by photoresist.

Dry etching, using the previous chemistry in the Oxford machine, is then performed to achieve a 0.167 μm step. This process is repeated, each time extending the protective photoresist layer another 25 μm from the wider end to define another step. The process is repeated until the desired number of steps is formed After forming the 2-D tapered waveguide core 21, a dielectric cladding layer 30 (See FIG. 6) is e-beam evaporated onto the stepped core layer 21 to form the channel waveguide structure 40. The processed wafer is then diced into appropriate pieces and cleaned. The wide end 25 of the tapered waveguide 40 is then mechanically polished to a mirror finish. To further reduce light coupling loss, an anti-reflective (AR) coating is applied to the polished end using conventional techniques.

Figure 6:
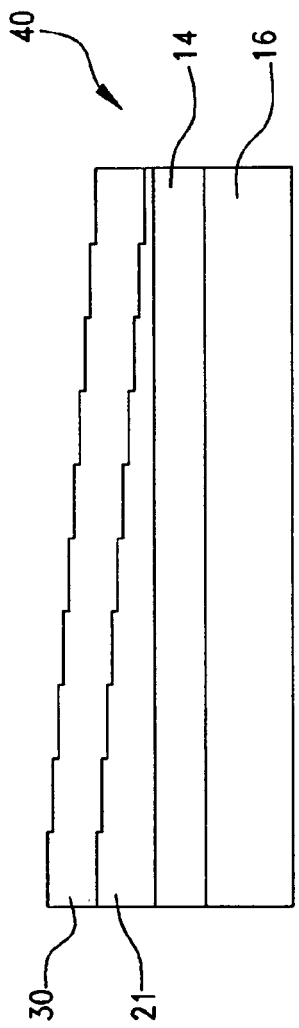
FIG. 6 is a conceptual cross-sectional side view of the tapered waveguide shown in FIG. 2 with a dielectric cladding layer deposited thereon, in accordance with another exemplary embodiment of the invention.

FIG. 6 is a conceptual cross-sectional side view of the tapered waveguide shown in FIG. 2 with a dielectric cladding layer 30 deposited thereon, in accordance with another exemplary embodiment of the invention. The dielectric cladding layer 30 is a 2 μm thick SiO2 top cladding layer that is e-beam evaporated onto the stepped core layer 21 to form the completed waveguide structure 40. The top cladding layer 30 has a refractive index of about 1.46.

In order to effectively couple light from optical fibers to high-index-contrast single mode planar waveguides, the tapered waveguides 20,40 can be formed as integral waveguide extensions of high-index-contrast single mode planar waveguides.

Figure 7:
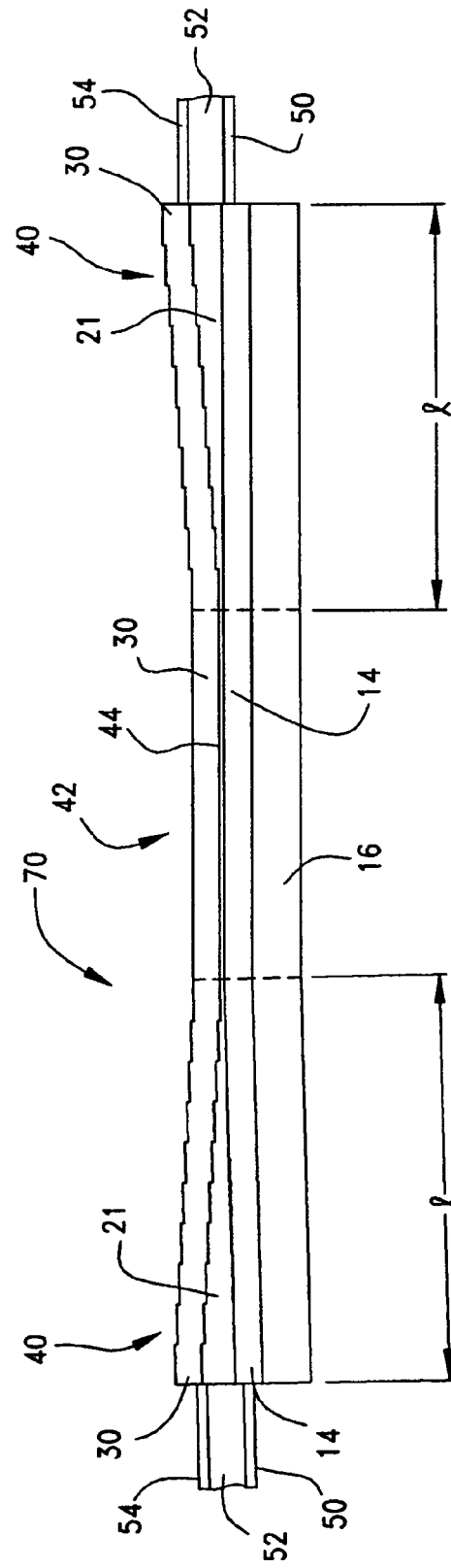
FIG. 7 is a conceptual cross-sectional side view of an optical system including the tapered waveguide of FIG. 6, in accordance with a further exemplary embodiment of the invention.

FIG. 7 is a conceptual cross-sectional side view of an optical system 70 including two of the tapered waveguides 40 integrally formed with and extending from a planar waveguide 42. The tapered waveguides 40 couple the planar waveguide 42 to high numerical aperture (HNA) optical fibers 50. The fibers 50 include a core 52 surrounded by cladding 54.

Although any single mode optical fiber can be coupled to the tapered waveguides disclosed herein, to further increase light coupling efficiency, a High Numerical Aperture (HNA) fiber may be used as the input fiber. A special splice program is used for coupling a regular single mode fiber SMF28 into the HNA fiber to further reduce light loss.

Each tapered waveguide 40 provides a lateral 1-D flare that extends from the planar waveguide width to a width of 4 μm within a horizontal distance of 250 μm. This lateral taper matches the mode field diameter (MFD) of high numerical aperture (HNA) optical fibers 50 to that of the planar waveguide 42 in the lateral direction. The stepped vertical flare extends from the planar waveguide height to 3 μm to match the MFD of the optical fiber 50, within the horizontal distance 1 of 250 μm.

Sample waveguides, some having a structure as illustrated in FIG. 6, were fabricated using the starting material illustrated in FIG. 1 and the method described herein. Testing was performed using an appropriate optical measurement setup that included a 1550 mn DFB laser, a 24 dBm amplifier, HNA input fiber, a microscope objective and a free space InGaAs detector to determine the waveguide propagation loss and the coupling loss between an HNA fiber and the sample waveguides. A comparison between at least three lengths of sample waveguides was used to find out the waveguide propagation loss value. Measurements of waveguide loss for 2-D, 1-D and no taper waveguide samples yielded the coupling efficiency of each taper type.

Experimental testing indicated a significant reduction in coupling loss between the HNA optical fiber and the stepped-taper waveguides, when compared to non-tapered waveguides. Actual test measurements demonstrated a coupling loss of about 2 dB for the 2-D stepped-taper waveguide. A 1-D stepped-taper waveguide was measured to have around 4 dB coupling loss. Without any taper, the waveguide coupling loss was measured to be larger than 8 dB.

The preceding detailed description has illustrated the principles of the invention using specific implementations of a tapered optical waveguide. However, the invention is not limited to these particular implementations. For example, the inventive principles disclosed herein can be implemented in many other types of substrate material structures, such as other semiconductor materials, such as InP, GaAs or the like, or polymer materials suitable for making waveguides, including polyimide, PMMA or the like.

Therefore, while one or more specific embodiments of the invention have been described, it will be apparent to those of ordinary skill in the art that many more embodiments are possible that are within the scope of this invention. Further, the foregoing detailed description and drawings are considered as illustrative only of the principles of the invention. Since other modifications and changes may be or become apparent to those skilled in the art, the invention is not limited the exact construction and operation shown and described, and accordingly, all suitable modifications and equivalents are deemed to fall within the scope of the invention.

What is claimed is:

1. A waveguide optical mode transformer, comprising:
   a core, the core being formed of a single material on a planar substrate structure and including a first end disposed adjacent the waveguide, a second end disposed adjacent an optical fiber, a top surface, a flat, planar bottom surface disposed adjacent the planar substrate structure, and side surfaces extending from the top surface to the flat, planar bottom surface; and
   a predetermined plurality of steps formed into the top surface, vertically tapering the core between the first and second ends, each step having a predetermined height and a predetermined length, the predetermined height and length being equal for each step;
   wherein each side surface includes a flat surface from the first end to the second end and from the top surface to the flat, planar bottom surface, creating a single, uniform, horizontal taper between the first and second ends.

2. The waveguide optical mode transformer of claim 1, wherein the vertical and horizontal tapers narrow at the same end of the core.

3. The waveguide optical mode transformer of claim 1, further comprising a dielectric cladding layer formed over the core.

4. The waveguide optical mode transformer of claim 1, wherein the planar substrate structure includes a dielectric layer formed over a semiconductor substrate.

5. The waveguide optical mode transformer of claim 1, wherein the core is crystalline silicon.

6. The waveguide optical mode transformer of claim 1, further comprising dielectric layers formed under and over the core.

7. The waveguide optical mode transformer of claim 6, wherein the dielectric layers each have a refractive index that is lower than the refractive index of the core.

8. An optical system, comprising:
   a planar waveguide; and
   a tapered waveguide extension, the tapered waveguide extension being formed at an end of the planar waveguide for coupling light between the planar waveguide and an optical fiber, the tapered waveguide extension including:
   a core, the core being formed of a single material on a planar substrate structure and including first end disposed adjacent the waveguide, a second end disposed adjacent an optical fiber, a top surface, a flat, planar bottom surface opposite the top surface and positioned adjacent the planar substrate structure, and side surfaces extending from the top surface to the flat, planar bottom surface and comprising a flat surface from the first end to the second end and from the top surface to the flat, planar bottom surface to create a single, uniform, horizontal taper; and
   a predetermined plurality of steps formed into the top surface by dry etching the waveguide extension, vertically tapering the waveguide extension between the first and second ends, each step having a predetermined height and length, the predetermined height and length being equal for each step, and being formed such that an edge thereof is parallel to the first and second ends.

9. The optical system of claim 8, wherein the tapered waveguide extension includes a crystalline silicon core.

10. The optical system of claim 9, wherein the tapered waveguide extension includes a dielectric cladding layer formed over the core.

11. The optical system of claim 8, wherein the tapered waveguide extension includes a core layer between two dielectric layers.

12. The optical system of claim 11, wherein the dielectric layers each have a refractive index that is lower than the refractive index of the core.

13. A method of manufacturing a tapered planar waveguide usable as an optical mode transformer between an optical fiber and a planar waveguide, the method comprising:
   (a) providing a planar substrate material;
   (b) forming a core layer of core material for the tapered waveguide on the planar substrate material, the core layer including a first end disposed adjacent the waveguide, a second end disposed adjacent an optical fiber, a top surface, and a flat, planar bottom surface opposite the top surface;
   (c) forming the first and second ends so that the first end is wider than the second end;
   (d) forming sidewalls so that they are flat and extend between the first and second ends and from the top surface to the flat, planar bottom surface to create a single, uniform, horizontal taper;

(e) applying a protective layer over a predetermined area of the core layer extending from the first end towards the second end to define a protected area and leaving an unprotected area thereon;

(f) dry etching the unprotected area to a predetermined depth defining a step having a height without etching through the single core material wherein an edge of the step is parallel to the first and second ends; and (g) repeating steps (e) and (f) a predetermined number of times, each time extending the protected area farther from the first end to define a length of a new step so as to form a predetermined number of steps in the top surface, vertically tapering the core layer, each step having a predetermined height and a predetermined length, the predetermined height and length being equal for each step.

14. The method of claim 13, wherein the step of providing the substrate further includes providing the substrate with a dielectric layer formed on the substrate, with the core layer of core material being formed thereon.

15. The method of claim 13, further comprising polishing the wider end of the tapered waveguide.

16. The method of claim 13, further comprising applying an anti-reflective coating at the wider end of the tapered waveguide.

* * * * *